United States Patent
Hong et al.

(10) Patent No.: US 8,896,519 B2
(45) Date of Patent: Nov. 25, 2014

(54) ELECTROPHORETIC DISPLAY AND DRIVING METHOD THEREOF

(75) Inventors: Seok-Joon Hong, Seoul (KR); Nam-Seok Roh, Seongnam-si (KR); Tae-Hyung Hwang, Seoul (KR); Hyung-Il Jeon, Incheon-si (KR); Yu-Jin Kim, Busan (KR)

(73) Assignee: Samsung Display Co., Ltd. (KR)

( * ) Notice: Subject to any disclaimer, the term of this patent is extended or adjusted under 35 U.S.C. 154(b) by 633 days.

(21) Appl. No.: 12/869,661

(22) Filed: Aug. 26, 2010

(65) Prior Publication Data

US 2011/0234562 A1    Sep. 29, 2011

(30) Foreign Application Priority Data

Mar. 25, 2010  (KR) .................. 10-2010-0026801

(51) Int. Cl.
*G09G 3/34* (2006.01)
*G02F 1/167* (2006.01)

(52) U.S. Cl.
CPC ........ *G09G 3/344* (2013.01); *G02F 2001/1678* (2013.01); *G02F 1/167* (2013.01); *G02F 2001/1676* (2013.01); *G02F 2001/1672* (2013.01); *G09G 2300/0452* (2013.01); *G02F 2203/34* (2013.01)
USPC ........................................ 345/107

(58) Field of Classification Search
USPC .......................................... 345/107, 84–104
See application file for complete search history.

(56) References Cited

U.S. PATENT DOCUMENTS

| | | | | |
|---|---|---|---|---|
| 4,093,534 | A * | 6/1978 | Carter et al. | 359/296 |
| 8,059,329 | B2 * | 11/2011 | Song et al. | 359/296 |
| 2004/0190114 | A1 | 9/2004 | Jacobson et al. | |
| 2008/0024430 | A1 * | 1/2008 | Roh | 345/107 |
| 2008/0062159 | A1 * | 3/2008 | Roh et al. | 345/205 |
| 2008/0158143 | A1 * | 7/2008 | Kim et al. | 345/107 |
| 2008/0291527 | A1 * | 11/2008 | Kim et al. | 359/296 |
| 2008/0304135 | A1 | 12/2008 | Van Delden et al. | |
| 2008/0316168 | A1 * | 12/2008 | Matsuda | 345/107 |
| 2010/0225575 | A1 * | 9/2010 | Ishii et al. | 345/107 |

FOREIGN PATENT DOCUMENTS

| | | |
|---|---|---|
| JP | 2005-003964 A | 1/2005 |
| JP | 2005-215092 A | 8/2005 |
| JP | 2007-256495 A | 10/2007 |
| JP | 2008-033000 A | 2/2008 |
| JP | 2009-009092 A | 1/2009 |
| JP | 2009-116941 A | 5/2009 |
| KR | 1020070048971 A | 5/2007 |
| KR | 1020070050437 A | 5/2007 |
| KR | 1020080019373 A | 3/2008 |
| KR | 1020090087011 A | 8/2009 |

* cited by examiner

*Primary Examiner* — Kent Chang
*Assistant Examiner* — Scott Au
(74) *Attorney, Agent, or Firm* — Innovation Counsel LLP

(57) ABSTRACT

An electrophoretic display according to an exemplary embodiment of the present invention may include: a first substrate, a first electrode formed on the first substrate, a second electrode spaced apart from the first electrode, a second substrate facing the first substrate, and a plurality of charged particles arranged between the first substrate and the second substrate, pairs of the charged particles having different polarities. Each charged particle has at least two threshold voltages, where the threshold voltages are voltage magnitudes below which a voltage applied across the first and second electrodes does not move the associated charged particle. The pixels may represent any one of colors such as red, green, blue, white, and black by including two charged particles of different colors in one pixel and changing the attractive and repulsive force threshold voltages of each of two charged particles of different colors contained in the pixel.

31 Claims, 6 Drawing Sheets

ELECTROPHORETIC DISPLAY AND DRIVING METHOD THEREOF

CROSS-REFERENCE TO RELATED APPLICATION

This application claims priority to, and the benefit of, Korean Patent Application No. 10-2010-0026801 filed in the Korean Intellectual Property Office on Mar. 25, 2010, the entire contents of which are incorporated herein by reference.

BACKGROUND OF THE INVENTION (a) Field of the Invention

The present invention relates generally to flat panel displays. More particularly, the present invention relates to an electrophoretic display and a method of driving the electrophoretic display.

(b) Description of the Related Art

Electrophoretic displays ("EPDs") are flat panel displays that are commonly used in applications such as electronic books. Electrophoretic displays can be classified into vertical electric field type electrophoretic displays and horizontal electric field type electrophoretic displays.

A vertical electric field type electrophoretic display typically includes two display panels having field generating electrodes, and an electric ink layer that is interposed between the two display panels. The ink includes microcapsules containing white or black positive charged particles and black or white negative charged particles.

A horizontal electric field type electrophoretic display includes a display panel having two field generating electrodes, an opposite display panel, and an ink layer that is interposed between the display panel and the opposite display panel. The ink contains white or black positive particles or negative particles.

The horizontal electric field electrophoretic display displays images by applying a voltage to the two field generating electrodes, thus generating a horizontal electric field that causes white and black charged particles to move toward those electrodes that have the same polarity.

In comparison with liquid crystal displays, electrophoretic displays have higher reflectivity and contrast ratio, and project images that are not as dependent on viewing angle. These characteristics allow the electrophoretic displays to project images that, to many readers, resemble books. Further, black and white color bi-stable characteristics of the electrophoretic displays enable images to be maintained even without continuous application of a voltage, thus saving power consumption.

Electrophoretic displays are often cheaper than liquid crystal displays, as they do not require a polarizer, alignment layer, or liquid crystal.

Electrophoretic displays typically use red, green, and blue charged particles, or red, green, and blue color filters to display colors. However, since electrophoretic displays are reflective display devices, electrophoretic displays cannot display a white color with only red, green, and blue charged particles, or red, green, and blue color filters.

To address this issue, electrophoretic displays often include white pixels without a color filter or with white charged particles. However, the use of white filters or particles yields a smaller color gamut. Further, because a white pixel corresponds to a quarter of a dot, white pixels cannot provide sufficiently bright white color and as a consequence contrast ratio is lowered.

The above information disclosed in this Background section is only for enhancement of understanding of the background of the invention and therefore it may contain information that is not known in the prior art.

SUMMARY OF THE INVENTION

Exemplary embodiments of the present invention provide an electrophoretic display with pixels of any color, including red, green, blue, white, and/or black. Also included is a driving method therefor.

According to an embodiment of the present invention, there is provided an electrophoretic display including a first substrate; a first electrode formed on the first substrate; a second electrode spaced apart from the first electrode; a second substrate facing the first substrate; and a plurality of charged particles arranged between the first substrate and the second substrate. Pairs of the charged particles have different polarities. Each charged particle has at least two threshold voltages, where the threshold voltages are voltage magnitudes below which a voltage applied across the first and second electrodes does not move the associated charged particle.

The electrophoretic display may further include a barrier wall arranged between the first substrate and the second substrate and having an opening that exposes the first electrode.

The plurality of charged particles may include colored charged particles and white charged particles.

The electrophoretic display may further include a lower light blocking layer formed on the first electrode.

The colored charged particles may include red, green, and blue charged particles.

The colored charged particles may include cyan, magenta, and yellow charged particles.

The electrophoretic display may further include an upper light blocking layer formed on the second substrate to correspond to the second electrode.

The colored charged particles may be positively charged and the white charged particles may be negatively charged.

The at least two threshold voltages of the colored charged particles may include a repulsive force threshold voltage and an attractive force threshold voltage, and the repulsive force threshold voltage may be different from the attractive force threshold voltage.

The at least two threshold voltages of the white charged particles may include a repulsive force threshold voltage and an attractive force threshold voltage, and the repulsive force threshold voltage may be different from the attractive force threshold voltage.

The at least two threshold voltages may include a repulsive force threshold voltage and an attractive force threshold voltage of the colored charged particles, and a repulsive force threshold voltage and an attractive force threshold voltage of the white charged particles. The repulsive force threshold voltage and the attractive force threshold voltage of the colored charged particles may be different from the repulsive force threshold voltage and the attractive force threshold voltage of the white charged particles, respectively.

The colored charged particles may be negatively charged and the white charged particles may be positively charged.

The second electrode may be formed on the first substrate.

The second electrode may be formed on the second substrate.

The electrophoretic display may further include a white reflecting layer formed on the first electrode, wherein the plurality of charged particles includes colored charged particles and black charged particles.

The colored charged particles may include red, green, and blue charged particles.

The colored charged particles may include cyan, magenta, and yellow charged particles.

The electrophoretic display may further include an upper light blocking layer formed on the second substrate to correspond to the second electrode.

The colored charged particles may be positively charged and the black charged particles may be negatively charged.

The at least two threshold voltages of the black charged particles may include a repulsive force threshold voltage and an attractive force threshold voltage, and the repulsive force threshold voltage may be different from the attractive force threshold voltage.

The at least two threshold voltages may include a repulsive force threshold voltage and an attractive force threshold voltage of the colored charged particles, and a repulsive force threshold voltage and an attractive force threshold voltage of the black charged particles. The repulsive force threshold voltage and the attractive force threshold voltage of the colored charged particles may be different from the repulsive force threshold voltage and the attractive force threshold voltage of the black charged particles, respectively.

The plurality of charged particles may include at least two of red, green, and blue charged particles.

According to an embodiment of the present invention, there is provided a method of driving an electrophoretic display including a pixel that contains a plurality of positive charged particles and a plurality of negative charged particles both positioned between a first electrode and a second electrode that is spaced apart from the first electrode, wherein each of the positive charged particles and the negative charged particles has at least two threshold voltages. The driving method includes positioning the positive charged particles and the negative charged particles under an upper light blocking layer when substantially no gray voltage is applied to the first and second electrodes; positioning the negative charged particles over the first electrode by applying a first gray voltage to the first and second electrodes, the first grayscale voltage having a magnitude greater than an attractive force threshold voltage of the negative charged particles; positioning the negative charged particles and the positive charged particles under the upper light blocking layer by applying a second gray voltage to the first and second electrodes, the second grayscale voltage having a magnitude greater than a repulsive force threshold voltage of the negative charged particles and lower than an attractive force threshold voltage of the positive charged particles; positioning the positive charged particles over the first electrode by applying a third gray voltage to the first and second electrodes, the third grayscale voltage having a magnitude greater than the attractive force threshold voltage of the positive charged particles; and positioning the negative charged particles and the positive charged particles under the upper light blocking layer by applying a fourth gray voltage to the first and second electrodes, the fourth grayscale voltage having a magnitude greater than the repulsive force threshold voltage of the positive charged particles and lower than the attractive force threshold voltage of the negative charged particles.

A lower light blocking layer may be formed on the first electrode. When the positive charged particles and the negative charged particles are positioned under the upper light blocking layer, the pixel may have a black color.

A white reflecting layer may be formed on the first electrode. When the positive charged particles and the negative charged particles are positioned under the upper light blocking layer, the pixel may have a white color.

When the negative charged particles are positioned on the first electrode, the pixel may have a color of the negative charged particles.

When the positive charged particles are positioned on the first electrode, the pixel may have a color of the positive charged particles.

According to an embodiment of the present invention, a pixel may display any one of colors such as red, green, blue, white, and black by changing the attractive force threshold voltage and repulsive force threshold voltage of each of two charged particles of different colors contained in the pixel.

An embodiment of the present invention may improve color gamut and contrast ratio by eliminating the need for separate white pixels.

DETAILED DESCRIPTION OF THE EMBODIMENTS

Figure 1:
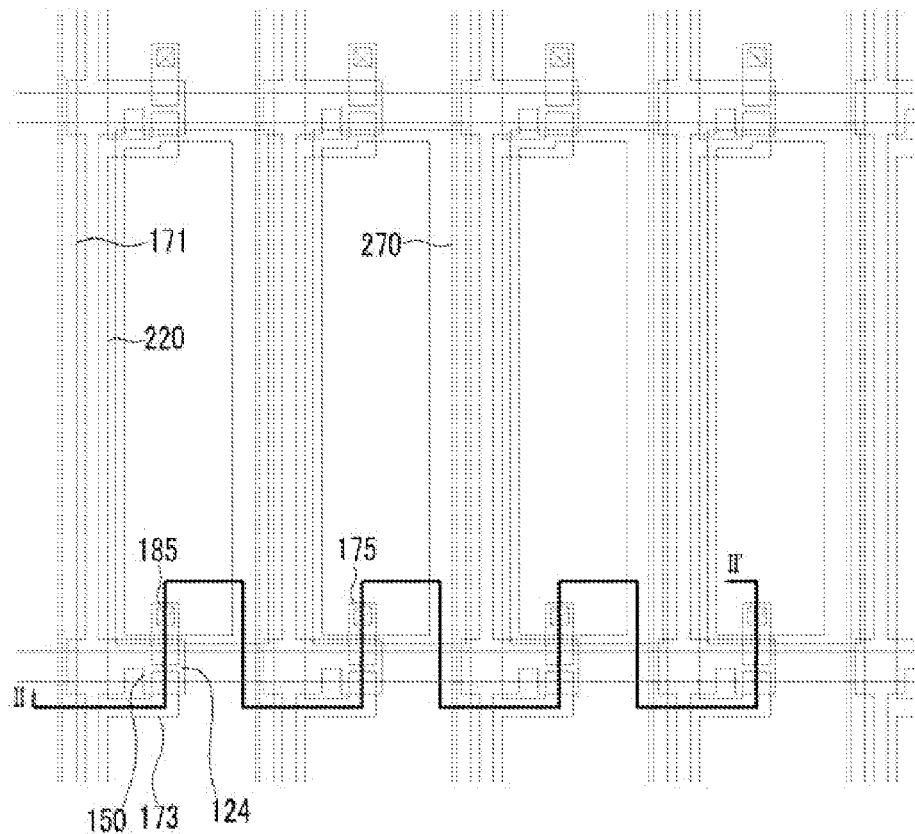
FIG. 1 is a layout view illustrating an electrophoretic display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on"

another element, it can be directly on the other element or intervening elements may also be present. In contrast, when an element is referred to as being "directly on" another element, there are no intervening elements present.

An electrophoretic display according to an exemplary embodiment of the present invention will be described with reference to FIGS. 1 to 3.

FIG. 1 is a layout view illustrating an electrophoretic display according to an exemplary embodiment of the present invention. FIG. 2 is a cross-sectional view taken along line II-II' of FIG. 1. FIG. 3 is a plan view illustrating a state in which the electrophoretic display of FIG. 2 displays a black color.

Figure 2:
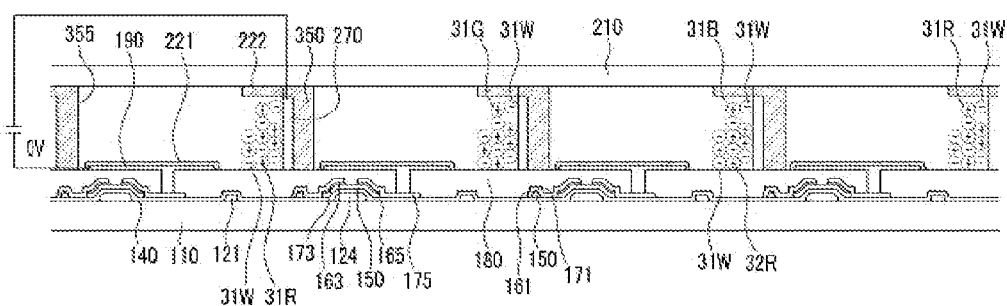
FIG. 2 is a cross-sectional view taken along line II-II' of FIG. 1.

Referring to FIGS. 1 and 2, an electrophoretic display according to an exemplary embodiment of the present invention includes a lower substrate 110 having a first electrode 190 and a second electrode 270; an upper substrate 210 that faces the lower substrate 110 and includes an upper light blocking layer 222 made of a non-transmissive material; and a plurality of charged particles 31R, 31G, 31B, and 31W in a plurality of openings 355 between the lower substrate 110 and the upper substrate 210.

In this embodiment, the first electrode 190 may be a pixel electrode 190 and the second electrode 270 may be a common electrode 270.

A plurality of gate lines 121 are formed mainly in a horizontal direction on the lower substrate 110. The substrate 110 may be a glass or flexible substrate.

A plurality of branches extend from the gate line 121, thereby forming gate electrodes 124 of thin film transistors.

A gate insulating layer 140 is formed over the gate line 121. The gate insulating layer 140 can be fabricated of, for example, silicon nitride (SiNx).

A plurality of semiconductor stripes (silicon islands) 150 are formed on the gate insulating layer 140. The stripes 150 can be made of, for example, hydrogenated amorphous silicon.

A plurality of branches of each semiconductor stripe 150 extends over the corresponding gate electrodes 124, so as to form the channels of the thin film transistors.

There is formed on the semiconductor stripes 150 a plurality of ohmic contact stripes and islands (ohmic contacts) 163 and 165 that can be made of n+ hydrogenated amorphous silicon doped with a high concentration of silicide or an n-type impurity. Each ohmic contact island 165 is positioned at an opposite side of the ohmic contact stripe 163 with respect to the gate electrode 124, and spaced apart from the ohmic contact stripe 163.

A plurality of data lines 171 and drain electrodes 175 are formed on the ohmic contacts 163 and 165 and the gate insulating layer 140. The data lines 171 extend mainly in a vertical direction, and thus intersect the gate lines 121. A plurality of branches from each data line 171 constitutes source electrodes 173.

Pairs of the source electrodes 173 and the drain electrodes 175 are positioned at least partially on the ohmic contacts 163 and 165, respectively, and spaced apart from each other to be opposite to each other with respect to the gate electrode 124.

The ohmic contacts 163 and 165 interposed between the semiconductor 150 and the data line 171 and drain electrode 175 lower a contact resistance between the semiconductor 150 and the data line 171 and drain electrode 175.

A passivation layer 180 with superior planarization characteristics is formed on the data line 171, the drain electrode 173, and those portions of the semiconductor 150 and gate insulating layer 140 that are not covered by the data line 171 and the drain electrode 173. The passivation layer 180 can be made of, for example, an organic insulating material.

The passivation layer 180 includes a contact hole 185 that exposes the drain electrode 175.

An interlayer insulating layer (not shown) may be formed of an insulating material, such as silicon oxide or silicon nitride under the passivation layer 180, and may cover part of the exposed semiconductor 150.

A pixel electrode 190 may be formed of a transparent conductive material, such as ITO (Indium Tin Oxide) or IZO (Indium Zinc Oxide), and is formed on the passivation layer 180.

The pixel electrode 190 is physically and electrically connected to the drain electrode 175 via the contact hole 185.

Barrier walls 350 are formed on the passivation layer 180, in positions corresponding to the gate line 121 and the data line 171. The barrier wall 350 can be formed of an organic layer containing a black pigment, and can be fabricated in a matrix pattern having openings, thus defining pixels.

The opening 355 is filled with an inert gas (not shown), such as argon, neon, or helium, and a plurality of charged particles 31R, 31G, 31B, and 31W. Alternatively, other gases besides an inert gas may be used. The invention contemplates use of any appropriate gas, such as nitrogen or dried air, that may be inserted in the opening 355 to preserve the charged particles 31R, 31G, 31B, and 31W. Further, the opening 355 may be maintained in a vacuum or filled with at least one of a non- or less-polar liquid, a solvent with a small amount of surface energy, and liquid crystal.

A common electrode 270 is formed at a side wall of the barrier wall 350. In operation, a horizontal electric field is generated between the pixel electrode 190 and the common electrode 270.

A lower light blocking layer 221 is formed on the pixel electrode 190. The layer 221 may be formed of a non-transmissive (i.e., opaque) material.

The upper light blocking layer 222 is formed on both the upper substrate 110 and the lower substrate 210, so as to cover the entirety of each pixel region.

Among the pixels, each red pixel has a plurality of positively charged red charged particles 31R and negatively charged white charged particles 31W, each green pixel has a plurality of positively charged green charged particles 31G and negatively charged white charged particles 31W, and each blue pixel has a plurality of positively charged blue charged particles 31B and negatively charged white charged particles 31W.

Throughout the specification, colored charged particles 31R, 31G, and 31B may include red charged particles 31R, green charged particles 31G, and blue charged particles 31B. Of the pixel electrode 190 and the common electrode 270, with the electrode with a higher applied voltage is referred to as a positive electrode, and the electrode with a lower applied voltage is referred to as a negative electrode.

The positively charged colored charged particles 31R, 31G, and 31B are formed to have repulsive force threshold voltages Vtrr, Vtgr, and Vtbr, respectively, and generate a repulsive force against the positive electrode. Conversely, the colored charged particles 31R, 31G, and 31B have attractive force threshold voltages Vtra, Vtga, and Vtba, respectively, and generate an attractive force toward the negative electrode. No repulsive is generated at a voltage lower than the repulsive force threshold voltages, and no attractive force is generated at a voltage lower than the attractive force threshold voltages.

Similar to the colored charged particles 31R, 31G and 31B, the negatively charged white charged particles 31W are formed to have a repulsive force threshold voltage Vtwr above which a repulsive force is generated between the negative electrode and the white charged particles 31W. The white charged particles 31W also have an attractive force threshold voltage Vtwa above which an attractive force is generated between the positive electrode and the white charged particles 31W. Thus, no repulsive is generated under a voltage less than the repulsive force threshold voltage, and no attractive force is generated under a voltage less than the attractive force threshold voltage.

The repulsive force threshold voltages and the attractive force threshold voltages of the colored charged particles 31R, 31G, and 31B are different from the repulsive force threshold voltage and the attractive force threshold voltage of the white charged particles 31W. Further, the absolute values of the repulsive force threshold voltages Vtrr, Vtgr, and Vtbr of positively charged colored charged particles 31R, 31G, and 31B may be smaller than the absolute values of the attractive force threshold voltages Vtra, Vtga, and Vtba of the colored charged particles 31R, 31G, and 31B.

As long as a voltage higher than the repulsive force threshold voltages is applied to the positive electrode, a repulsive force is exerted against the colored charged particles 31R, 31G, and 31B contained in a pixel, so that the colored charged particles 31R, 31G, and 31B move in the opposite direction of (i.e., away from) the positive electrode. However, only when a voltage higher than the attractive force threshold voltages (whose absolute values are larger than those of the repulsive force threshold voltages) is applied to the negative electrode, is an attractive force exerted against the colored charged particles 31R, 31G, and 31B so that the colored charged particles 31R, 31G, and 31B move toward the negative electrode.

Further, the absolute value of the repulsive force threshold voltage Vtwr of the negatively charged white charged particles 31W may be smaller than the absolute value of the attractive force threshold voltage Vtwa of the white charged particles 31W.

Accordingly, as long as a voltage higher than the repulsive force threshold voltage is applied to the negative electrode, a repulsive force is exerted against the white charged particles 31W contained in a pixel, so that the white charged particles 31W move away from the negative electrode. However, only when a voltage higher than an attractive force threshold voltage is applied to the positive electrode, is an attractive force exerted against the white charged particles 31W so that the white charged particles 31W move toward the positive electrode.

Upon abutting the pixel electrode 190, the charged particles 31R, 31G, 31B, and 31W are arranged in a single layer. In this case, since the charged particles 31R, 31G, 31B, and 31W are positioned adjacent to the pixel electrode 190 and a gray voltage is applied to the pixel electrode 190, the particles 31R, 31G, 31B, and 31W may react according to changes in the gray voltage, effectively reducing the attractive force threshold voltage and the repulsive force threshold voltage.

Upon abutting the common electrode 270, the charged particles 31R, 31G, 31B, and 31W are arranged in multiple layers. In this case, due to their distance from the pixel electrode 190, the charged particles 31R, 31G, 31B, and 31W are only slightly influenced by changes in gray voltage, effectively increasing the attractive force threshold voltage and the repulsive force threshold voltage relative to when the charged particles 31R, 31G, 31B, and 31W lie close to the pixel electrode 190.

Further, performing a surface treatment on the lower light blocking layer 221 allows the charged particles 31R, 31G, 31B, and 31W to be more easily detached from the pixel electrode 190, thus further reducing the attractive force threshold voltage and the repulsive force threshold voltage.

The colored charged particles 31R, 31G, and 31B and the white charged particles 31W may have their repulsive force threshold voltage and attractive force threshold voltage adjusted by fabricating each of the charged particles 31R, 31G, 31B, and 31W with the appropriate amount of charged elements.

Further, the colored charged particles 31R, 31G, and 31B may be different in mass from the white charged particles 31W, providing an additional mechanism for adjusting the repulsive force threshold voltage and the attractive force threshold voltage.

As such, the colored charged particles 31R, 31G, and 31B and the white charged particles 31W in a pixel have different attractive force threshold voltages and repulsive force threshold voltages. Under this situation, when a positive gray voltage higher than the attractive force threshold voltage of the white charged particles 31W is applied to the pixel electrode 190, the pixel displays white W. When a negative gray voltage higher than the attractive force threshold voltage of the colored charged particles 31R, 31G, and 31B is applied to the pixel electrode 190, the pixel displays one of red R, green G, and blue B. When a positive gray voltage smaller than the attractive force threshold voltage of the white charged particles 31W and a negative gray voltage smaller than the attractive force threshold voltage of the colored charged particles 31R, 31G, and 31B are applied to the pixel electrode 190, the white charged particles 31W and the colored charged particles 31R, 31G, and 31B are positioned under the upper light blocking layer. The pixel thus displays black D.

Accordingly, one pixel can represent any one of red R, green G, blue B, white W, and black D.

Hereinafter, a method of representing any one of red R, green G, blue B, white W, and black D in a single pixel will be described with reference to FIGS. 2 to 9.

Figure 4:
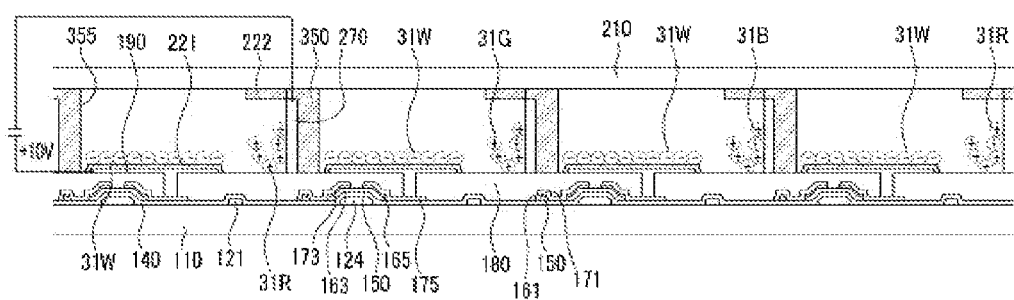
FIG. 4 is a cross-sectional view illustrating a state in which one pixel displays white by applying a gray voltage of +10V to the electrophoretic display shown in FIG. 1.
Figure 5:
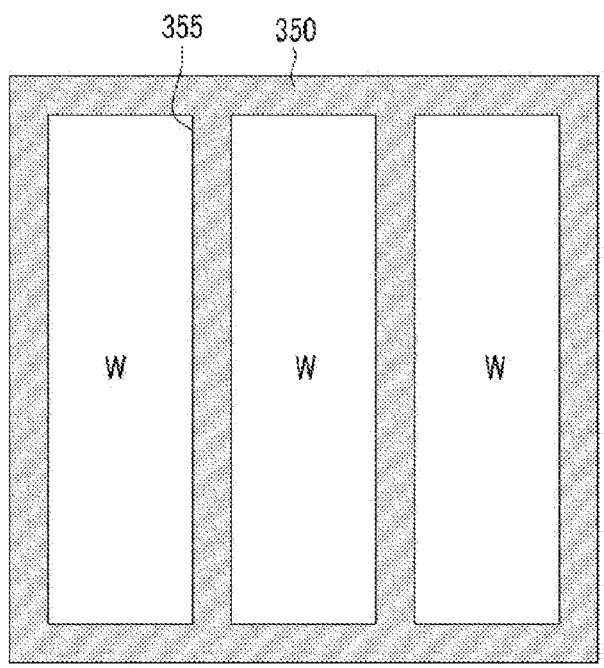
FIG. 5 is a top plan view illustrating a state in which one pixel displays white in the electrophoretic display shown in FIG. 4.
Figure 6:
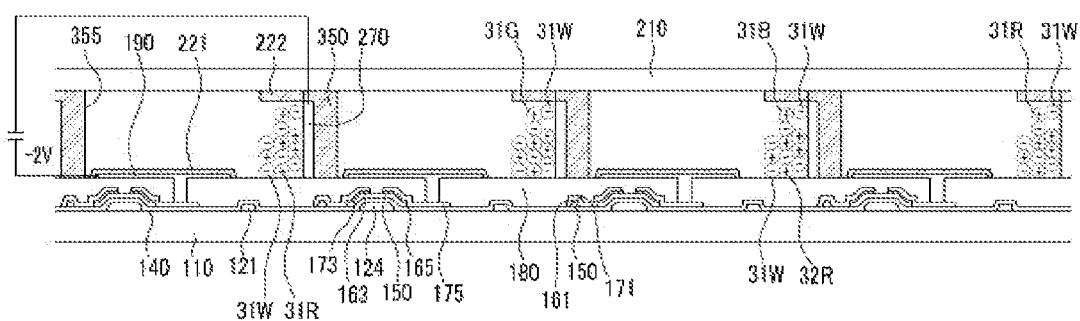
FIG. 6 is a cross-sectional view illustrating a state in which one pixel displays black by applying a gray voltage of −2V to the electrophoretic display shown in FIG. 1.
Figure 7:
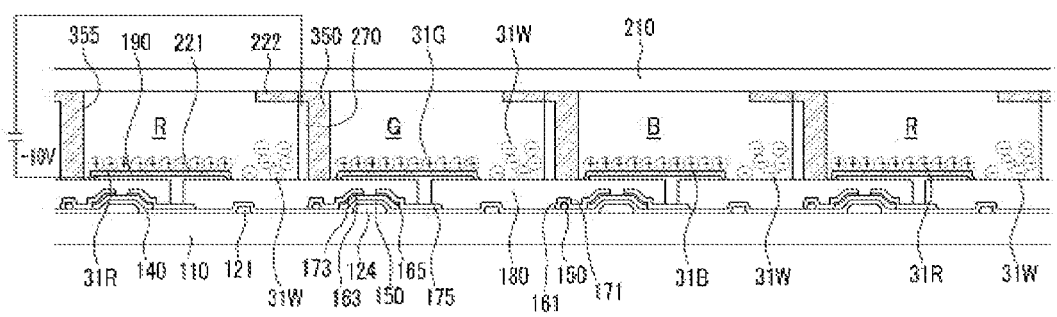
FIG. 7 is a cross-sectional view illustrating a state in which one pixel displays any one of red, green, and blue by applying a gray voltage of −10V to the electrophoretic display shown in FIG. 1.
Figure 8:
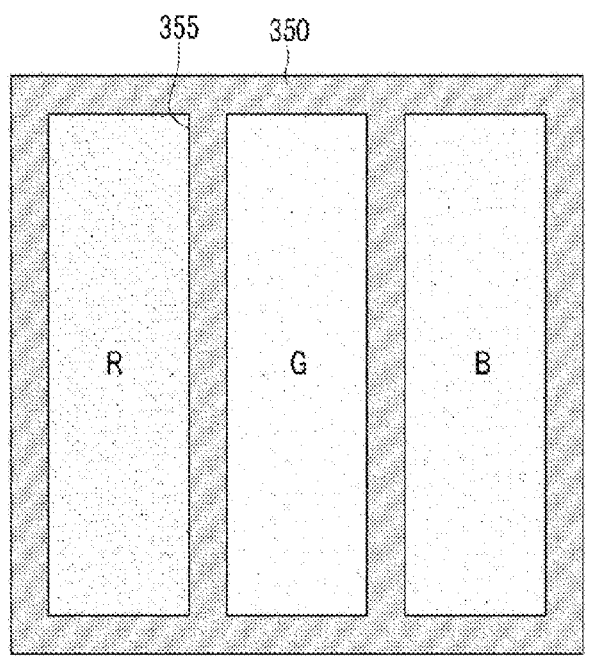
FIG. 8 is a top plan view illustrating a pixel in the electrophoretic display shown in FIG. 7.
Figure 9:
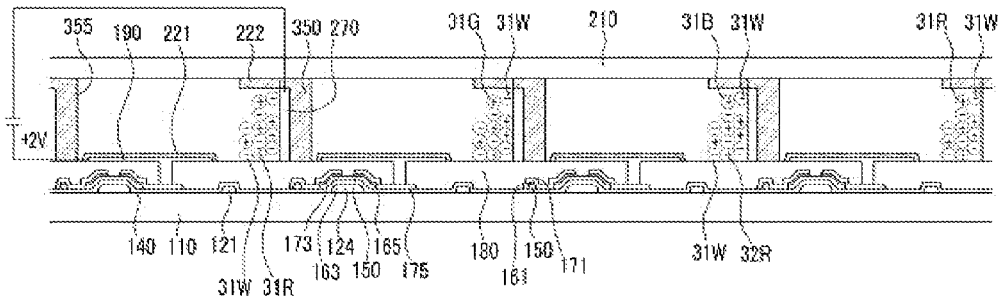
FIG. 9 is a cross-sectional view illustrating a state in which one pixel displays black by applying a gray voltage of +2V to the electrophoretic display shown in FIG. 1.

FIG. 4 is a cross section view illustrating a situation in which a pixel displays white by applying a gray voltage of +10V to the electrophoretic display of FIG. 1. FIG. 5 is a plan view illustrating a situation in which the pixel in the electrophoretic display of FIG. 4 displays white. FIG. 6 is a cross section view illustrating a situation in which a pixel displays black by applying a gray voltage of −2V to the electrophoretic display of FIG. 1. FIG. 7 is a cross section view illustrating a situation in which a pixel displays one of red, green, and blue by applying a gray voltage of −10V to the electrophoretic display of FIG. 1. FIG. 8 is a plan view illustrating the pixel in the electrophoretic display shown in FIG. 7. FIG. 9 is a cross section view illustrating a situation in which a pixel displays white by applying a gray voltage of +2V to the electrophoretic display of FIG. 1.

In the electrophoretic display according to the embodiment described in connection with FIGS. 2 to 9, it is assumed that the repulsive force threshold voltages Vtrp, Vtgp, and Vtbp and the attractive force threshold voltages of the positively charged colored charged particles 31R, 31G, and 31B are +1V and −4V respectively, and the repulsive force threshold voltage and the attractive force threshold voltage of the negatively charged white charged particles 31W are −1V and +4V respectively.

Figure 3:
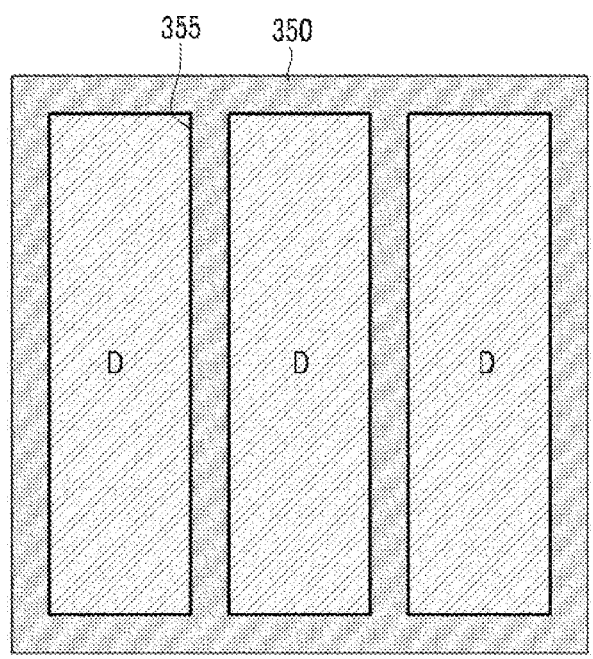
FIG. 3 is a top plan view illustrating a state in which one pixel displays black in the electrohoretic display shown in FIG. 2.

As shown in FIGS. 2 and 3, in an initial state when substantially no gray voltage is applied between the pixel electrode 190 and the common electrode 270, the negatively charged white charged particles 31W and the positively charged colored charged particles 31R, 31G, and 31B are positioned under the upper light blocking layer while contacting the common electrode 270.

Neither attractive electric force nor repulsive electric force affects the negative charged white charged particles 31W or the positively charged colored charged particles 31R, 31G, and 31B, and thus, the initial state is maintained. Since the colored charged particles 31R, 31G, and 31B and the white charged particles 31W that are brought in contact with the common electrode 270 are blocked by the upper light blocking layer, light is incident to the lower light blocking layer 221 through the opening. As a consequence, the pixel displays black D.

As shown in FIGS. 4 and 5, when a gray voltage of +10V is applied to the pixel electrode 190, the negatively charged white charged particles 31W receive a gray voltage of more than the +4V that is their attractive force threshold voltage. Thus, an attractive force occurs between the white charged particles 31W and the pixel electrode 190, and the negatively charged white charged particles 31W are attracted to the pixel electrode 190. As a consequence, the white charged particles 31W cover the pixel electrode 190.

In this case, the positively charged colored charged particles 31R, 31G, and 31B receive a gray voltage of more than the +1V that is their repulsive force threshold voltage, and thus a repulsive force occurs between the colored charged particles 31R, 31G, and 31B and the pixel electrode 190. Accordingly, the positively charged colored charged particles 31R, 31G, and 31B move toward the common electrode 270.

The colored charged particles 31R, 31G, and 31B that are brought in contact with the common electrode 270 are blocked by the upper light blocking layer, and light incident to the opening is reflected by the white charged particles 31W covering the pixel electrode 190. The pixel thus displays white W.

As shown in FIG. 6, when a gray voltage of −2V is applied to the pixel electrode 190, the negatively charged white charged particles 31W receive a gray voltage of more than the −1V that is their repulsive force threshold voltage, and thus a repulsive force occurs between the white charged particles 31W and the pixel electrode 190. Accordingly, the negatively charged white charged particles 31W move toward the common electrode 270.

In this case, since the positively charged colored charged particles 31R, 31G, and 31B receive a gray voltage of less than the −4V that is their attractive force threshold voltage, the colored charged particles 31R, 31G, and 31B do not move toward the pixel electrode 190.

Accordingly, the colored charged particles 31R, 31G, and 31B and the white charged particles 31W that are brought in contact with the common electrode 270 are all blocked by the upper light blocking layer, and light is incident onto the lower light blocking layer 221 through the opening. The pixel displays black D.

As shown in FIGS. 7 and 8, when a gray voltage of −10V is applied to the pixel electrode 190, the positively charged colored charged particles 31R, 31G, and 31B receive a gray voltage of more than the −4V that is their attractive force threshold voltage, and thus an attractive force occurs between the colored charged particles 31R, 31G, and 31B and the pixel electrode 190. Accordingly, the positively charged colored charged particles 31R, 31G, and 31B move toward the pixel electrode 190. As a consequence, the colored charged particles 31R, 31G, and 31B cover the pixel electrode 190.

In this case, the negatively charged white charged particles 31W receive a gray voltage of more than the −1V that is their repulsive force threshold voltage, and thus a repulsive force occurs between the white charged particles 31W and the pixel electrode 190. Accordingly, the negatively charged white charged particles 31W move toward the common electrode 270.

Accordingly, the white charged particles 31W brought in contact with the common electrode 270 are blocked by the upper light blocking layer, and light incident to the opening is reflected by the colored charged particles 31R, 31G, and 31B, so that the pixel having the red charged particles displays red R, the pixel having the green charged particles displays green G, and the pixel having the blue charged particles displays blue B.

As shown in FIG. 9, when a gray voltage of +2V is applied to the pixel electrode 190, the positively charged colored charged particles 31R, 31G, and 31B receive a gray voltage of more than the +1V that is their repulsive force threshold voltage, and thus a repulsive force occurs between the colored charged particles 31R, 31G, and 31B and the pixel electrode 190. Accordingly, the positively charged colored charged particles 31R, 31G, and 31B move toward the common electrode 270.

In this case, since the negatively charged white charged particles 31W receive a gray voltage of less than the +4V that is their attractive force threshold voltage, the white charged particles 31W do not move toward the pixel electrode 190.

Accordingly, the colored charged particles 31R, 31G, and 31B and the white charged particles 31W that are brought in contact with the common electrode 270 are all blocked by the upper light blocking layer, and light is incident onto the lower light blocking layer 221 through the opening. The pixel thus displays black D.

Although it has been described in the present embodiment that the colored charged particles 31R, 31G, and 31B are positively charged and the white charged particles 31W are negatively charged, the invention also includes embodiments in which the colored charged particles 31R, 31G, and 31B are negatively charged and the white charged particles 31W positively charged. Similarly, the invention contemplates different values of attractive and repulsive force threshold voltages besides those listed above.

Although it has been described in the present embodiment that red charged particles 31R, green charged particles 31G, and blue charged particles 31B are used for the colored charged particles, cyan charged particles, magenta charged particles, and yellow charged particles may also be used for the colored charged particles. Indeed, the invention contemplates use of charged particles of any color or colors.

Although it has been described in the present embodiment that the common electrode 270 is positioned on the lower substrate 110, the common electrode 270 may also be positioned on the upper substrate 210.

Figure 10:
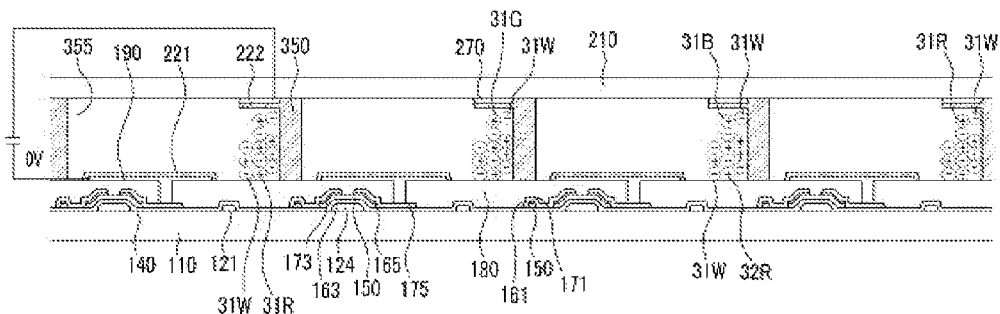
FIG. 10 is a cross-sectional view illustrating an electrophoretic display according to an exemplary embodiment of the present invention.

FIG. 10 is a cross-sectional view illustrating an electrophoretic display according to a further exemplary embodiment of the present invention.

The present embodiment is substantially the same as the embodiment described in connection with FIGS. 1 to 3, except that the common electrode 270 is positioned on the upper substrate 210. Accordingly, any redundant descriptions will be omitted.

Referring to FIG. 10, an electrophoretic display according to this embodiment includes a lower substrate 110 having a first electrode 190, an upper substrate 210 that faces the lower substrate 110 and has a common electrode 270, a barrier wall 350 that is positioned between the lower substrate 110 and the upper substrate 210 and that has a plurality of openings, and a plurality of charged particles 31R, 31G, 31B, and 31W arranged in the openings 355.

According to this embodiment, the first electrode 190 may be a pixel electrode 190 and the second electrode 270 may be a common electrode 270.

An upper light blocking layer 222 may be formed of a non-transmissive material, and is formed on the common electrode 270.

A substantially vertical electric field is generated between the pixel electrode 190 and the common electrode 270 due to their relative positions. The upper light blocking layer 222 is formed on the upper substrate 110 and the lower substrate 210, so as to cover the entirety of the pixel.

The colored charged particles 31R, 31G, and 31B and the white charged particles 31W are contained in the pixels, and their attractive force threshold voltage and repulsive force threshold voltage are different from each other. Under this situation, when a positive gray voltage higher than the attractive force threshold voltage of the white charged particles 31W is applied to the pixel electrode 190, the pixel displays white W. When a negative gray voltage higher than the attractive force threshold voltage of the colored charged particles 31R, 31G, and 31B is applied to the pixel electrode 190, the pixel displays one of red R, green G, and blue B. When a positive gray voltage smaller than the attractive force threshold voltage of the white charged particles 31W and a negative gray voltage smaller than the attractive force threshold voltage of the colored charged particles 31R, 31G, and 31B are applied to the pixel electrode 190, the white charged particles 31W and the colored charged particles 31R, 31G, and 31B are positioned under the upper light blocking layer. The pixel then displays black D.

Accordingly, one pixel can represent each of red R, green G, blue B, white W, and black D.

Although black D and white W are displayed by using the lower light blocking layer 221 and the white charged particles 31W, black and white may also be displayed by using a white reflecting layer 223 instead of the lower light blocking layer 221 and black charged particles 31D instead of white charged particles 31W.

An electrophoretic display using a white reflecting layer and black charged particles will now be described with reference to FIGS. 11 and 12.

Figure 11:
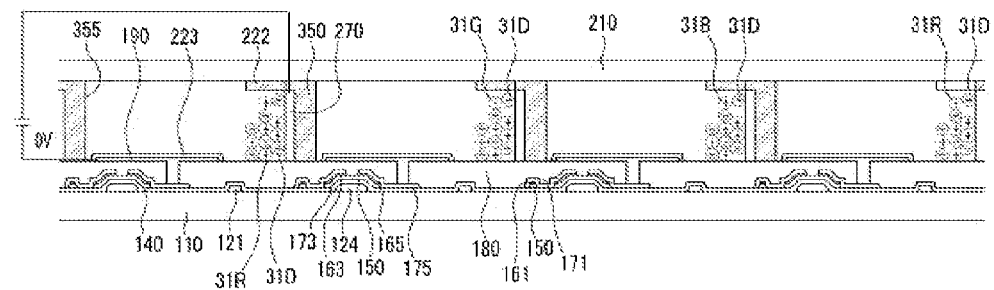
FIG. 11 is a cross-sectional view illustrating an electrophoretic display according to an exemplary embodiment of the present invention.

FIG. 11 is a cross-sectional view illustrating an electrophoretic display according to an exemplary embodiment of the present invention. FIG. 12 is a cross-sectional view illustrating a state in which one pixel displays black by applying a gray voltage of +10V to the electrophoretic display shown in FIG. 11.

The present embodiment is substantially the same as the embodiment described in connection with FIGS. 1 to 3, except that a white reflecting layer and black charged particles are employed. Thus, any repetitive descriptions will be largely omitted.

Referring to FIG. 11, an electrophoretic display according to this embodiment includes a pixel electrode 190 and a white reflecting layer 223 formed on the pixel electrode 190.

A red pixel includes a plurality of positively charged red charged particles 31R and negatively charged black charged particles 31D, a green pixel includes a plurality of positively charged green charged particles 31G and negatively charged black charged particles 31D, and a blue pixel includes a plurality of positively charged blue charged particles 31B and negatively charged black charged particles 31D.

The positively charged colored charged particles 31R, 31G, and 31B are formed to have repulsive force threshold voltages Vtrr, Vtgr, and Vtbr above which a repulsive force is generated between a positive electrode and the colored charged particles 31R, 31G, and 31B. The particles also have attractive force threshold voltages Vtra, Vtga, and Vtba above which an attractive force is generated between a negative electrode and the colored charged particles 31R, 31G, and 31B. As in previous embodiments, no repulsive force is generated under a voltage lower than the repulsive force threshold voltages, and no attractive force is generated under a voltage lowered than the attractive force threshold voltages.

The negatively charged black charged particles 31D are formed to have a repulsive force threshold voltage Vtwr above which a repulsive force is generated between the negative electrode and the black charged particles 31D, as well as an attractive force threshold voltage Vtwa above which an attractive force is generated between the positive electrode and the black charged particles 31D. Thus, as above, no repulsive force is generated under a voltage lower than the repulsive force threshold voltage, and no attractive force is generated under a voltage lower than the attractive force threshold voltage.

The repulsive force threshold voltages and the attractive force threshold voltages of the colored charged particles 31R, 31G, and 31B are formed to be different from the repulsive force threshold voltage and the attractive force threshold voltage of the black charged particles 31D, respectively.

Further, the absolute values of the repulsive force threshold voltages Vtrr, Vtgr, and Vtbr of positively charged colored charged particles 31R, 31G, and 31B may be smaller than the absolute values of the attractive force threshold voltages Vtra, Vtga, and Vtba of the colored charged particles 31R, 31G, and 31B.

As long as a voltage higher than the repulsive force threshold voltages is applied to the positive electrode, a repulsive force is exerted against the colored charged particles 31R, 31G, and 31B contained in a pixel, so that the colored charged particles 31R, 31G, and 31B move are repelled away from the positive electrode. However, only when a voltage higher than the attractive force threshold voltages (whose absolute values are larger than those of the repulsive force threshold voltages) is applied to the negative electrode, is an attractive force exerted against the colored charged particles 31R, 31G, and 31B so that the colored charged particles 31R, 31G, and 31B move toward the negative electrode.

Further, the absolute value of the repulsive force threshold voltage Vtdr of the negatively charged black charged particles 31D may be smaller than the absolute value of the attractive force threshold voltage Vtda of the black charged particles 31D.

Accordingly, as long as a voltage higher than the repulsive force threshold voltage is applied to the negative electrode, a repulsive force is exerted against the black charged particles 31D, so that the black charged particles 31D move away from the negative electrode. However, only when an attractive force threshold voltage (whose absolute value is larger than the repulsive force threshold voltage) is applied to the positive electrode, is an attractive force exerted against the black charged particles 31D so that the black charged particles 31D move toward the positive electrode.

As shown in FIG. 11, in an initial state when substantially no gray voltage is applied to the pixel electrode 190 and the common electrode 270, the negatively charged black charged particles 31D and the positively charged colored charged particles 31R, 31G, and 31B are positioned under the upper light blocking layer while contacting the common electrode 270. None of the negative charged black charged particles 31D and the positively charged colored charged particles 31R, 31G, and 31B are yet subjected to an attractive electric force or repulsive electric force, so that this initial state is maintained.

In this initial state, the colored charged particles 31R, 31G, and 31B and the black charged particles 31D are proximate to the common electrode 270, and are thus blocked from view by the upper light blocking layer. Light incident to the opening 355 is therefore reflected by the white reflecting layer 223, and the pixel displays white W.

Figure 12:
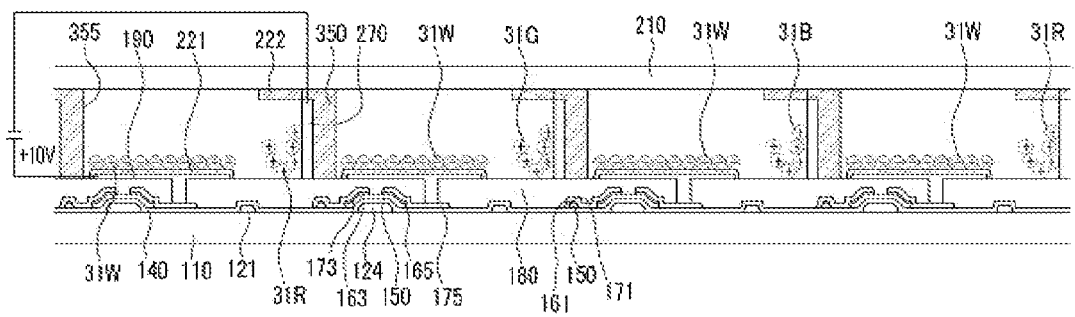
FIG. 12 is a cross-sectional view illustrating a state in which one pixel displays black by applying a gray voltage of +10V to the electrophoretic display shown in FIG. 11.

As shown in FIG. 12, when a gray voltage of +10V is applied to the pixel electrode 190, the negatively charged black charged particles 31D receive a gray voltage of more than the +4V that is the attractive force threshold voltage, and thus an attractive force occurs between the black charged particles 31D and the pixel electrode 190. Accordingly, the negatively charged black charged particles 31D move to the pixel electrode 190. As a consequence, the black charged particles 31D cover the pixel electrode 190.

In this case, the positively charged colored charged particles 31R, 31G, and 31B receive a gray voltage of more than the +1V that is the repulsive force threshold voltage, and thus a repulsive force occurs between the colored charged particles 31R, 31G, and 31B and the pixel electrode 190. Accordingly, the positively charged colored charged particles 31R, 31G, and 31B move to the common electrode 270.

The colored charged particles 31R, 31G, and 31B that are brought in contact with the common electrode 270 are blocked by the upper light blocking layer, and light incident to the opening is reflected by the black charged particles 31D covering the pixel electrode 190. The pixel thus displays black D.

Although chromatic colors and white color have been described as being displayed by using the colored charged particles 31R, 31G, and 31B and the white charged particles 31W in a pixel, the invention includes the use of charged particles with other colors as well. For example, cyan charged particles, magenta charged particles, and yellow charged particles may also be employed.

Although it has been described in the present embodiment that the colored charged particles 31R, 31G, and 31B are positively charged and the black charged particles 31D are negatively charged, the reverse may also be the case. That is, the colored charged particles 31R, 31G, and 31B may be negatively charged, and the black charged particles 31D may be positively charged.

Although it has been described in the present embodiment that the red charged particles 31R, the green charged particles 31G, and the blue charged particles 31B are used for the colored charged particles, cyan charged particles, magenta charged particles, and yellow charged particles may also be used for the colored charged particles.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrophoretic display, comprising:
    a first substrate having a horizontal surface;
    a first electrode formed on the horizontal surface of the first substrate;
    a second substrate overlapping the first substrate;
    an opaque material layer that is disposed on the first electrode and completely covers the first electrode;
    barrier walls formed between the first substrate and the second substrate, the barrier walls defining pixels;
    a second electrode spaced apart from the first electrode and formed on a vertical surface of a barrier wall of the barrier walls, the vertical surface of the barrier wall and the second electrode extending not parallel to the horizontal surface of the first substrate;
    a plurality of charged particles arranged between the first substrate and the second substrate, pairs of the charged particles having different polarities;
    an upper light blocking layer formed on the second substrate in a region to entirely cover the pairs of the charged particles when the pairs of the charged particles are attracted to the second electrode,
    wherein each charged particle of the charged particles has at least two threshold voltages, and
    wherein the opaque material layer and the upper light blocking layer together cover an entire area of a pixel.

2. The electrophoretic display of claim 1, further comprising:
    a barrier wall arranged between the first substrate and the second substrate and having an opening that exposes the first electrode.

3. The electrophoretic display of claim 2, wherein:
    the plurality of charged particles includes colored charged particles and white charged particles.

4. The electrophoretic display of claim 3, wherein the opaque material layer is a lower light blocking layer formed on the first electrode.

5. The electrophoretic display of claim 4, wherein:
    the colored charged particles include red, green, and blue charged particles.

6. The electrophoretic display of claim 4, wherein:
    the colored charged particles include cyan, magenta and yellow charged particles.

7. The electrophoretic display of claim 3, wherein:
    the upper light blocking layer corresponds to the second electrode.

8. The electrophoretic display of claim 3, wherein:
    the colored charged particles are positively charged and the white charged particles are negatively charged.

9. The electrophoretic display of claim 8, wherein:
    the at least two threshold voltages of the colored charged particles include a repulsive force threshold voltage and an attractive force threshold voltage, and the repulsive force threshold voltage is different from the attractive force threshold voltage.

10. The electrophoretic display of claim 8, wherein:
    the at least two threshold voltages of the white charged particles include a repulsive force threshold voltage and an attractive force threshold voltage, and the repulsive force threshold voltage is different from the attractive force threshold voltage.

11. The electrophoretic display of claim 8, wherein:
    the at least two threshold voltages include a repulsive force threshold voltage and an attractive force threshold voltage of the colored charged particles, and a repulsive force threshold voltage and an attractive force threshold voltage of the white charged particles, and
    the repulsive force threshold voltage and the attractive force threshold voltage of the colored charged particles are different from the repulsive force threshold voltage and the attractive force threshold voltage of the white charged particles, respectively.

12. The electrophoretic display of claim 6, wherein:
the colored charged particles are negatively charged and the white charged particles are positively charged.

13. The electrophoretic display of claim 12, wherein:
the at least two threshold voltages of the colored charged particles include a repulsive force threshold voltage and an attractive force threshold voltage, and the repulsive force threshold voltage is different from the attractive force threshold voltage.

14. The electrophoretic display of claim 12, wherein:
the at least two threshold voltages of the white charged particles include a repulsive force threshold voltage and an attractive force threshold voltage, and the repulsive force threshold voltage is different from the attractive force threshold voltage.

15. The electrophoretic display of claim 12, wherein:
the at least two threshold voltages include a repulsive force threshold voltage and an attractive force threshold voltage of the colored charged particles, and a repulsive force threshold voltage and an attractive force threshold voltage of the white charged particles, and
the repulsive force threshold voltage and the attractive force threshold voltage of the colored charged particles are different from the repulsive force threshold voltage and the attractive force threshold voltage of the white charged particles, respectively.

16. The electrophoretic display of claim 3, wherein:
the second electrode is formed on the first substrate.

17. The electrophoretic display of claim 3, wherein:
the second electrode is formed on the second substrate.

18. The electrophoretic display of claim 2,
wherein the opaque material layer is a white reflecting layer formed on the first electrode, and
wherein the plurality of charged particles includes colored charged particles and black charged particles.

19. The electrophoretic display of claim 18, wherein:
the colored charged particles include red, green, and blue charged particles.

20. The electrophoretic display of claim 18, wherein:
the colored charged particles include cyan, magenta, and yellow charged particles.

21. The electrophoretic display of claim 18, wherein:
the upper light blocking layer corresponds to the second electrode.

22. The electrophoretic display of claim 18, wherein:
the colored charged particles are positively charged and the black charged particles are negatively charged.

23. The electrophoretic display of claim 22, wherein:
the at least two threshold voltages of the colored charged particles include a repulsive force threshold voltage and an attractive force threshold voltage, and the repulsive force threshold voltage is different from the attractive force threshold voltage.

24. The electrophoretic display of claim 22, wherein:
the at least two threshold voltages of the black charged particles include a repulsive force threshold voltage and an attractive force threshold voltage, and the repulsive force threshold voltage is different from the attractive force threshold voltage.

25. The electrophoretic display of claim 22, wherein:
the at least two threshold voltages include a repulsive force threshold voltage and an attractive force threshold voltage of the colored charged particles, and a repulsive force threshold voltage and an attractive force threshold voltage of the black charged particles, and
the repulsive force threshold voltage and the attractive force threshold voltage of the colored charged particles are different from the repulsive force threshold voltage and the attractive force threshold voltage of the black charged particles, respectively.

26. The electrophoretic display of claim 2, wherein:
the plurality of charged particles includes at least two of red, green, and blue charged particles.

27. A method of driving an electrophoretic display comprising a plurality of pixels and barrier walls defining the pixels and formed between opposing first and second substrates, a pixel of the plurality of pixels containing a plurality of positive charged particles and a plurality of negative charged particles both positioned between a first electrode formed on a horizontal surface of the first substrate and a second electrode that is spaced apart from the first electrode and formed on a vertical surface of a barrier wall of the barrier walls, wherein the vertical surface of the barrier wall and the second electrode extending not parallel to the horizontal surface of the first substrate, and each of the positive charged particles and the negative charged particles has at least two threshold voltages, the method comprising:

positioning the positive charged particles and the negative charged particles next to the second electrode to be entirely covered by an upper light blocking layer when substantially no grayscale voltage is applied to the first and second electrodes;

positioning the negative charged particles over the first electrode and positioning the positive charged particles next to the second electrode to be entirely covered by the upper light blocking layer by applying a first grayscale voltage to the first and second electrodes, the first grayscale voltage having a magnitude greater than an attractive force threshold voltage of the negative charged particles;

positioning the negative charged particles and the positive charged particles next to the second electrode to be entirely covered by the upper light blocking layer by applying a second grayscale voltage to the first and second electrodes, the second grayscale voltage having a magnitude greater than a repulsive force threshold voltage of the negative charged particles and lower than an attractive force threshold voltage of the positive charged particles;

positioning the positive charged particles over the first electrode and positioning the negative charged particles next to the second electrode to be entirely covered by the upper light blocking layer by applying a third grayscale voltage to the first and second electrodes, the third grayscale voltage having a magnitude greater than the attractive force threshold voltage of the positive charged particles;

positioning the negative charged particles and the positive charged particles next to the second electrode to be entirely covered by the upper light blocking layer by applying a fourth grayscale voltage to the first and second electrodes, the fourth grayscale voltage having a magnitude greater than the repulsive force threshold voltage of the positive charged particles and lower than the attractive force threshold voltage of the negative charged particles; and displaying at least one of black and white using an opaque material layer that is disposed on the first electrode and completely covers the first electrode, wherein the opaque material layer and the upper light blocking layer together cover an entire area of a pixel.

28. The driving method of claim 27, wherein
the opaque material layer is a lower light blocking layer formed on the first electrode, and wherein when the positive charged particles and the negative charged particles are positioned under the upper light blocking layer, the pixel has a black color.

29. The driving method of claim 27, wherein the opaque material layer is a white reflecting layer formed on the first electrode, and wherein when the positive charged particles and the negative charged particles are positioned under the upper light blocking layer, the pixel has a white color.

30. The driving method of claim 27, wherein:
when the negative charged particles are positioned on the first electrode, the pixel has a color of the negative charged particles.

31. The driving method of claim 27, wherein:
when the positive charged particles are positioned on the first electrode, the pixel has a color of the positive charged particles.

* * * * *